United States Patent
Kim et al.

(10) Patent No.: US 8,386,933 B2
(45) Date of Patent: Feb. 26, 2013

(54) APPARATUS AND METHOD FOR PROVIDING DIGITAL CONTENT

(75) Inventors: Yeo-jin Kim, Hwaseong-si (KR); Yun-gyung Cheong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 498 days.

(21) Appl. No.: 12/431,901

(22) Filed: Apr. 29, 2009

(65) Prior Publication Data

US 2010/0031191 A1    Feb. 4, 2010

(30) Foreign Application Priority Data

Aug. 4, 2008    (KR) .................. 10-2008-0076202

(51) Int. Cl.
*G06F 13/00*    (2006.01)
*G06F 15/00*    (2006.01)

(52) U.S. Cl. ......................................... 715/719; 715/723
(58) Field of Classification Search .......... 345/418–475, 345/521; 715/764, 808, 719–723, 716–717, 715/726–729
See application file for complete search history.

(56) References Cited

U.S. PATENT DOCUMENTS 7,822,738 B2 * 10/2010 Andersen et al. ............. 707/713
7,844,951 B2 * 11/2010 Chen et al. ................... 717/124
2008/0052414 A1 * 2/2008 Panigrahi et al. ............. 709/246

* cited by examiner

*Primary Examiner* — Cao "Kevin" Nguyen
(74) *Attorney, Agent, or Firm* — NSIP Law

(57) ABSTRACT

A digital content providing apparatus including an interactive content composer to compose continuous interactive contents by linking at least two content units depending on at least one pre-condition or post-condition selected determined on the basis of a user's request and a reproducer to seamlessly reproduce the composed interactive contents.

16 Claims, 9 Drawing Sheets

APPARATUS AND METHOD FOR PROVIDING DIGITAL CONTENT

CROSS-REFERENCE TO RELATED APPLICATION

This application claims the benefit under 35 U.S.C. §119 (a) of Korean Patent Application No. 10-2008-0076202, filed on Aug. 4, 2008, the disclosure of which is incorporated herein in its entirety by reference.

BACKGROUND

1. Field

The following description relates to a digital content managing apparatus and method. More particularly, this description relates to an apparatus and method which provide digital interactive content and user requested data in real time.

2. Description of the Related Art

A story is a series of events. "Narrative" is used as a synonym of "story" but further implies a story told from one or more points of view. A narrative includes a plot that is a sequence of events conceived to achieve artistic or emotional effects where the underlying story may change in terms of discovery and dramatic effect according to composition of the plot. That is, various narratives are possible within one story.

With such properties, a narrator tends to make a story exciting by recomposing a sequence of events or focusing more significantly on a certain event while observing a listener's response. For instance, a human narrator may respond to a listener's curiosity with respect to contents, such as period background of an event, a character, the past, etc., based on the narrator's own background, knowledge, or creativity even though such contents are not included in the original story. In this case, it may be said that a story space is open.

Similarly, a digital interactive story has contents where a story varies depending on interaction between a user and a system. Technology has been developed to transfer the role of telling a story from a human narrator to a computer narrator. However, a conventional computer narrator is not aware of contents outside of an original given story and thus cannot respond to a user's curiosity that wanders from the original given content. Thus, it may be said that this story space is closed.

Planning is used to automatically organize the plot of a digital interactive story. Planning is technology that plans a route to reach a goal state from a current state. Main elements constituting planning may include a node, a pre-condition, a post-condition, a planning algorithm, etc.

The node is a situation or a state of a story, and the pre-condition of each node is a condition that has to be satisfied before reaching the node concerned. The post-condition is a condition that has to be satisfied after reaching the node concerned, and is also called an effect from the point of view of updating the current state. Meanwhile, a planning algorithm is an algorithm used to make a plan to achieve a goal state from a current state, and is roughly classified into a forward planning algorithm and a backward planning algorithm.

The forward planning algorithm retrieves a node whose pre-condition is regarded as a post-condition of a current node from the current node and searches for a path to a target node to reach the target node. The backward planning algorithm retrieves a node whose post-condition is regarded as a pre-condition of a target node from the target node and searches for a path to a current node to reach the target node.

In the case that the digital interactive story is composed through planning, the pre-condition and the post-condition of each node are generally effective only within a content area that an author wants to represent. If a user requests other contents that do not exist in an area of contents while watching/listening to the contents, desired content units cannot be linked properly even though they may exist in another content area making it impossible to recompose and provide only necessary content units. That is, conventional planning technology is limited in that it provides the user with plots of the story composed only within one content area.

At present, in the case that a user watches and listens to contents on the Internet, the user uses a method of selecting contents through a web search and watching/listening to the selected contents. In this case, a user has to repeat processes of selecting the contents through the web search and watching/listening to the selected contents whenever the unit of contents is finished, because the story space is closed.

SUMMARY

In a general aspect, a digital content providing apparatus includes an interactive content composer to compose continuous interactive contents by linking at least two content units depending on at least one pre-condition or post-condition selected determined on the basis of a request of a user and a reproducer to seamlessly reproduce the composed interactive contents.

The interactive content composer may include a searching part to search for a target content unit evaluated to have a closest pre-condition to the user's request and an automatic content creator to create a separate content unit to satisfy in real time a part of unsatisfied pre-conditions needed for running the target content unit in a current state.

The automatic content creator may be configured to create separate content unit prompting the user to select or to respond to the separate content unit in order to satisfy the part of the unsatisfied pre-conditions.

The reproducer may reproduce the target content units continuously in response to a selection or a response of the user acquired by reproducing the separate content unit.

The interactive content creator may include a searching part to search for a target content unit having a pre-condition closest to the request of the user and a planning part to generate a content unit chain by tracking a separate content unit having post-conditions corresponding to a part of unsatisfied pre-conditions needed for running the target content unit in a current state.

The planning part may generate the content unit chain by extending the tracking to other content areas when no content unit containing post-conditions corresponding to the part of the unsatisfied pre-conditions is located.

The planning part may perform at least one of abandoning a pre-condition which has a relative low weight by weighting at least one pre-condition of the target content unit, abandoning a pre-condition which is determined to be relatively less important than other pre-conditions based on a context, and abandoning a pre-condition dependent on only one content area concerned regardless of the request of the user.

The reproducer may reproduce the target content unit chain after satisfying the pre-conditions of the target content unit.

In another general aspect, a method for providing digital contents may include composing by an interactive content composer continuous interactive contents by linking at least two content units depending on at least one pre-condition or post-condition selected on the basis of a request of a user and reproducing by a reproducer the composed interactive content seamlessly.

Composing the interactive content may include searching for a target content unit evaluated to have a closest pre-condition to the request of the user and creating a separate content unit to satisfy in real time a part of unsatisfied pre-conditions needed for running the target content unit in a current state.

Creating the separate content unit may include creating a separate content unit to prompt the user to select or respond in order to satisfy the part of the unsatisfied pre-conditions.

Reproducing the composed interactive content may include continuously reproducing the target content units in response to the selection or response of the user acquired by reproducing the separate content unit.

Composing the interactive content may include searching for a target content unit having a pre-condition closest to the user's request and generating a content unit chain by tracking a separate content unit whose post-conditions correspond to a part of unsatisfied pre-conditions needed for running the target content unit in a current state.

Composing the interactive content may include generating a content unit chain by extending the tracking to other content areas when no content unit whose post-conditions correspond to the part of the unsatisfied pre-conditions is located.

Composing the interactive content also may include at least one of abandoning a pre-condition which has a relative low weight by weighting at least one pre-condition of the target content unit, abandoning a pre-condition determined to be relatively less important than other pre-conditions based on context, and abandoning a pre-condition dependent on only one content area concerned regardless of the user's request.

Reproducing the composed interactive content may include reproducing a target content unit chain after satisfying the pre-conditions of the target content unit.

Other features and aspects will be apparent from the following detailed description, the drawings, and the claims

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, methods, apparatuses, and systems described herein. Accordingly, various changes, modifications, and equivalents of the systems and methods described herein will be suggested to those of ordinary skill in the art. Also, descriptions of well-known functions and constructions may be omitted to increase clarity and conciseness.

For convenience of the reader, a list of terms used throughout the specification are generally provided as follows.

The term "interactive contents" includes contents in which a scenario varies or various events occur depending on a user's input.

The term "content unit" includes a unit of content constituting the interactive contents.

The term "planning algorithm" includes technology to plan routes to a goal state from a current state when the goal state is set.

The term "pre-condition" includes a condition that should be satisfied before running one content unit.

The term "post-condition" includes a condition satisfied as a result of running one content unit, and is also called an effect in light of the fact that it is caused.

The term "content database" includes a space shared with a plurality of authors to upload contents.

The term "content area" indicates an area having an interactive content.

In view of the terms provided above, a digital content providing apparatus and a method to provide digital contents are described below.

Figure 1:
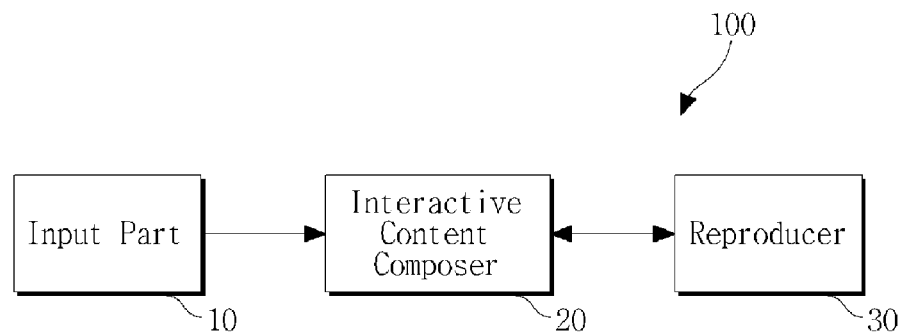
FIG. 1 is a block diagram illustrating an exemplary digital content providing apparatus.

FIG. 1 illustrates an exemplary digital content providing apparatus 100. The digital content providing apparatus 100 includes an input part 10, an interactive content composer 20, and a reproducer 30.

The input part 10 receives a user's request, which enables interaction between the user and contents through a program or a separate reproducer, such as an interactive content player. Through the user input part 10, the user may input a search keyword for desired contents to watch or listen to, in which the desired contents may be requested in various manners including a question type. For example, where the user is watching or listening to contents about Korean history, the user may ask the digital content providing apparatus 100, through the input part 10, "What was going on in Europe during Korea's Goryeo Dynasty in the 14$^{th}$ century?" As another example, the user may wish to study differential equations and thus request contents about "differential equations."

The interactive content composer 20 may interpret the user's input request and extract at least one pre-condition based on the input request. Then, the interactive content composer 20 may search for and select a content unit that includes the extracted pre-condition as its pre-condition and may link the selected content unit with a previous content unit to compose a kind of continuous interactive content. That is, an interaction function may be automatically added between two or more content units selected for one purpose so that continuity may be given while providing the contents. Further, interaction between the user and the continuous interactive contents may bring results closer to the user's intended request and may provide a method to allow the user to reach the requested contents within a very broad content space.

The reproducer 30 may seamlessly and continuously reproduce the interactive contents composed by the interactive content composer 20. Meanwhile, if a target content unit is a content unit to be selected by the user's request and provided to the user, the current state may not satisfy all the pre-conditions of the target content unit. In this case, the interactive content composer 20 may create a content unit candidate group where each content unit candidate has the pre-condition extracted in response to the user's request, (i.e., closely related to the user's request). Then, the interactive content composer 20 may select from the content candidate group a content unit evaluated as closest to the user's request as the target content unit. To determine which of the candidate content unit, is closest to the user's request, various evaluation functions or evaluation algorithms may be used.

The interactive content composer 20 may satisfy the pre-condition of the target content unit and then may seamlessly and continuously reproduce the interactive contents as described below with respect to FIG. 2.

Figure 2:
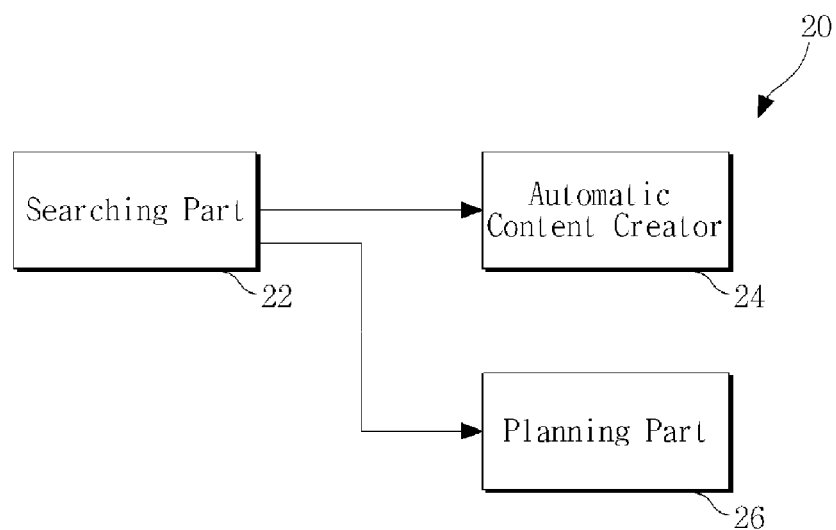
FIG. 2 is a block diagram further illustrating the digital content providing apparatus show in FIG. 1.

FIG. 2 further illustrates the exemplary digital content providing apparatus shown in FIG. 1.

Automatic Content Unit Creating Method

A method of interpreting unsatisfied conditions and creating a content unit to satisfy the unsatisfied conditions (hereinafter, referred to as an "automatic content unit creating method") may be used by the interactive content composer 20 to provide the interaction function.

The interactive content composer 20 may include a searching part 22 to search for the target content unit evaluated to have the closest pre-condition to the user's request and an automatic content creator 24 to create separate content units to satisfy a part of the unsatisfied pre-conditions needed to run the target content unit in the current state in real time.

Here, the automatic content creator 24 may create separate content units and may prompt the user to select or respond in order to satisfy the unsatisfied pre-conditions. Thus, the reproducer 30 may seamlessly reproduce the target content unit according to the selection or the response of the user obtained by reproducing the separate content units automatically created by the automatic content creator 24.

Hybrid Forward-Backward Planning Method

A method of making and carrying out a plan to achieve the target content unit based on the user's request by combining forward and backward planning algorithms through a planning part 26 (hereinafter, referred to as a "hybrid forward-backward planning method") may be used.

Referring to FIG. 2, the interactive content composer 20 may include the searching part 22 to search for the content unit candidate having the pre-condition evaluated as closest to the user's request, and the planning part 26 to generate a content unit chain by tracking separate content units having post-conditions corresponding to the part of the unsatisfied pre-conditions closest to the user's request.

Where content units having post-conditions corresponding to the part of the unsatisfied pre-conditions are not determined to be within one content area, tracking may extend to other content areas to generate the content unit chain. Thus, the reproducer 30 may satisfy any unsatisfied pre-conditions of the target content unit through the planning part 26 and thus may produce the content unit chain continuously.

The interactive content composer 20 may include both the automatic content creator 24 and the planning part 26. That is, the interactive content composer 20 may include both the automatic content creator 24 to automatically create the separate content units for inducing condition satisfaction, and the planning part 26 to generate the content unit chain by tracking separate content units having post-conditions corresponding to the part of unsatisfied pre-conditions.

Referring to FIGS. 1 and 2, the digital content providing apparatus 100 may operate as follows. When the user inputs information about contents he/she desires to watch or listen to (e.g., "world history in the $14^{th}$ century") through the input part 10, the information of the user's request may be sent to the searching part 22 of the interactive content composer 20. The searching part 22 may interpret the user's request and may search for a content unit that satisfies the search condition in a content database (not shown). The reproducer 30 may reproduce the searched content unit. When reproduction of one content unit is complete, the reproducer 30 may inform the interactive content composer 20. The interactive content composer 20 may then determine whether the pre-conditions for the next content unit are fully satisfied. If the pre-conditions are fully satisfied, the next searched content unit may be provided to the searching part 22 and reproduced.

When some of the pre-conditions are not satisfied (i.e., if there is no content unit that satisfies all pre-conditions in the current state), the interactive content composer 20 may search for the content unit candidates having the closest pre-conditions in the current state within a fundamental target range.

To satisfy some of pre-conditions that are not satisfied by the content unit candidates, the above-described automatic content unit creating method may be performed through the automatic content creator 24 or the hybrid forward-backward planning method may be performed through the planning part 26.

Figure 3:
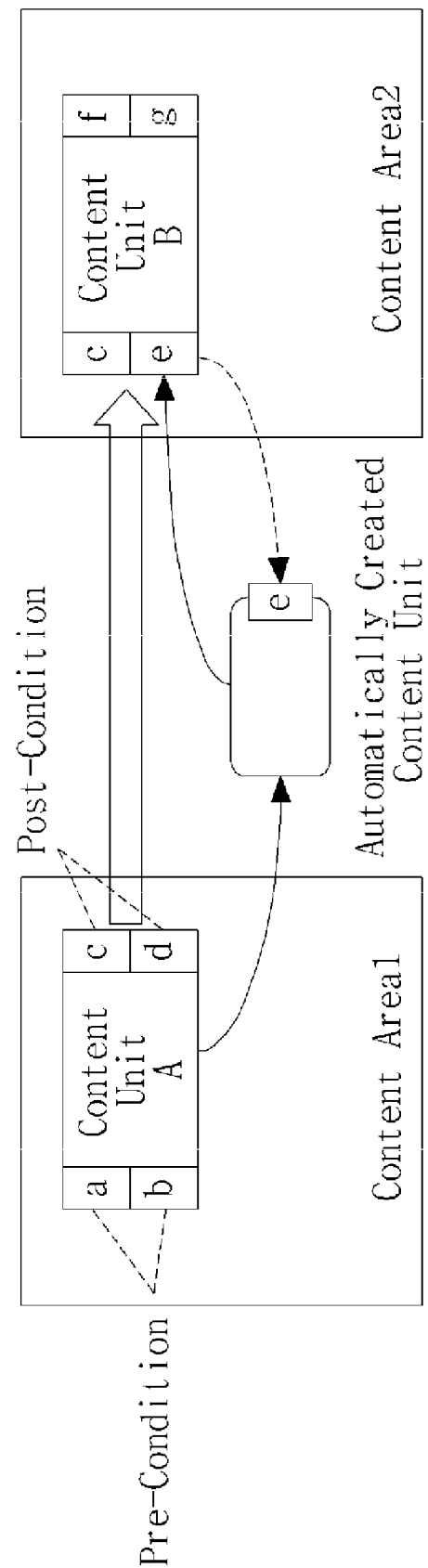
FIG. 3 is a diagram illustrating an operation of an exemplary digital content providing apparatus.
Figure 4:
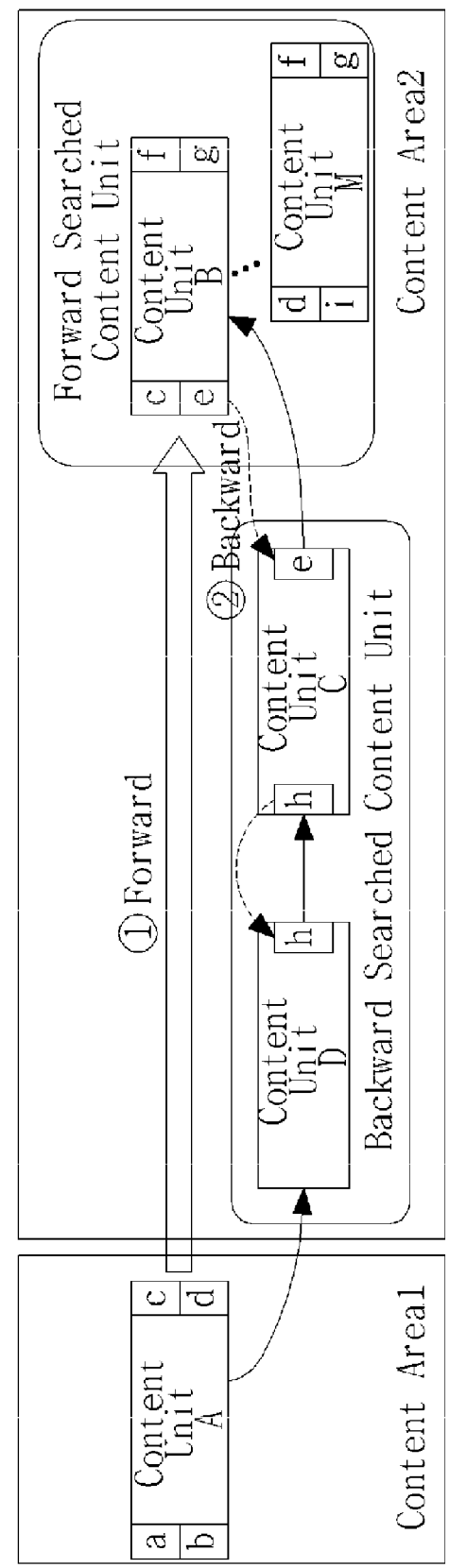
FIG. 4 a diagram illustrating an exemplary planning method of moving from a current content unit node A to a target content unit node B.
Figure 5:
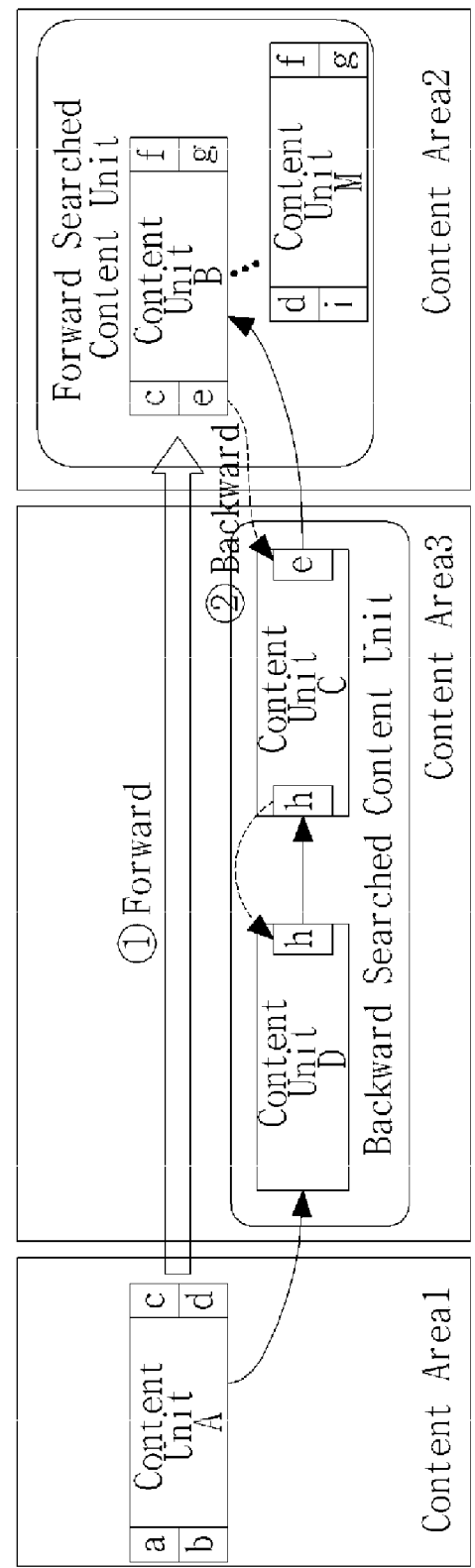
FIG. 5 a diagram illustrating another operation of an exemplary digital content providing apparatus.

Below, an operation of composing the interactive contents is described. FIGS. 3, 4, and 5 illustrate operations of an exemplary digital content providing apparatus.

FIG. 3 shows an operation of an exemplary digital content providing apparatus in which the automatic content unit creating method is performed by the automatic content creator 24. In this case, if a user does not know a necessary input method and cannot satisfy a pre-condition of contents, a method of soliciting the user's response or selection in order to satisfy the pre-condition is used.

In this example, a method of condition-satisfying one content area is employed and a method of condition-satisfying a content area other than the current content area is created or found from another content area.

At this time, a separate content unit for prompting the user to satisfy the condition may be created in real time. For example, there are various methods of creating the content unit to solicit the user's response by displaying a question using a keyword of an unsatisfied condition to prompt user input, by displaying an object showing the keyword of the unsatisfied condition on a screen to prompt user selection, etc. At this time, the display of the question may be given to a user in the form of speech of character displayed on the current screen and the display of the selection screen may use various characters, props or the like brought from a content database or the Internet, or only a link may be shown. The automatically created content unit is reproduced and acquires a necessary condition through interaction with the user, thereby moving to the searched target content unit where it may be continuously reproduced.

Referring to FIG. 3, in the case that a target content unit B having pre-conditions c and e as a content unit closest to a user's request is searched for after reproducing a content unit A searched for in response to the user's request, the current states c and d may not satisfy the part e of the pre-conditions c and e of the target content unit B. At this time, a content unit to solicit user interaction in order to satisfy the pre-condition e is automatically created, and all pre-conditions may be satisfied by the user interaction and thereby reproduce the content unit candidate B.

For example, in the case that the content unit B which has "Britain," "14$^{th}$ century," and "Hundred Years' War" as a pre-condition is searched for, if the first two conditions are satisfied but it is not determined whether the last condition is satisfied, a content unit asking the user "Do you want to know about the Hundred Years' War?" may be automatically created to satisfy the unsatisfied condition, thereby providing interaction with the user. If the user answers "yes," the pre-conditions are all satisfied so that the content unit B can be reproduced. If the user answers "no," the user may be asked about whether to ignore the pre-conditions, or the current target content unit may be changed into another content unit candidate.

If it is difficult to create the content unit for inducing satisfaction of the unsatisfied condition, the hybrid forward-backward planning method may be tried.

FIGS. 4 and 5 illustrate an exemplary case in which the hybrid forward-backward planning method is performed through the planning part 26. FIG. 4 shows that the hybrid forward-backward planning method is applied in the same content area. FIG. 5 shows that the hybrid forward-backward planning method is applied in different content areas.

This panning method may automatically compose a series of contents by planning a route if a current state and a target state are given. That is, the pre-condition and the post-condition may be set to nodes indicating the content units so that a story can continue via the nodes satisfying the conditions.

FIG. 4 shows an exemplary planning method of moving from a current content unit Anode to a target content unit B node. Pre-conditions a and b should be satisfied in order to reproduce the content unit A node, and the post-conditions c and d may be satisfied after the content unit A node is completely reproduced. Accordingly, a story moves to the target content unit B node when pre-conditions c and e are satisfied. When the story of the content unit B node is completed, the post-conditions f and g are satisfied.

Here, forward planning may designate an algorithm to search for a route from the current node to the target node in order to reach the target state and thus reach the target node by finding a node whose pre-conditions are post-conditions of the current node. Backward planning may designate an algorithm to search for a route from the target node to the current node in order to reach the target state and thus reach the current node by finding a node whose post-conditions are pre-conditions of the target node.

In the case of the existing planning method, there may be a limit to automatically linking the contents while composing the interactive contents. In other words, in the case that the existing planning method may be used to compose the interactive contents, it may be impossible to link the content units between different content areas since an author cannot set up the pre-conditions and post-conditions to be logically linked between content units of different content areas in advance.

However, the hybrid forward-backward planning method may solve this problem by combining forward planning and backward planning. That is, the forward planning method may be employed to search for content unit candidates having the closest pre-conditions to the current state, and the backward planning method may be employed to track content units whose post-conditions are unsatisfied pre-conditions of the content unit candidate, thereby forming a content unit chain.

Thus, the hybrid forward-backward planning method may automatically insert content units that satisfy any unsatisfied conditions by taking a search keyword of the unsatisfied conditions into account.

First, the content unit candidates that satisfy the pre-conditions necessary to reach the target state are determined. If the necessary pre-conditions can be searched for in the same content area, as shown in FIG. 4, previous content units C and D are tracked down in the content area concerned, thereby forming a content unit chain (backward chaining).

In general, one content area involves the previous content unit satisfying the pre-conditions of the content unit included therein. However, if the necessary pre-conditions are not found in one content area, as shown in FIG. 5, the content unit chain may be formed by tracking the previous content unit in another content area (backward chaining).

In this case, the pre-condition may be satisfied by linking to the previously tracked content unit, to thereby reach and reproduce the target content unit.

When pre-conditions are not continuously satisfied while forming the content unit chain, tracking should be performed up to the first content unit of the chain. However, this method may exhibit poor system performance and efficiency. Considerable pre-conditions may be filtered by adding various methods of abandoning pre-conditions having relative low weight by weighting at least one pre-condition selected on the basis of the user's request; abandoning pre-conditions determined to be relatively less important than others based on context; abandoning pre-conditions which depend on only the content area concerned regardless of the user's request; etc.

Figure 6:
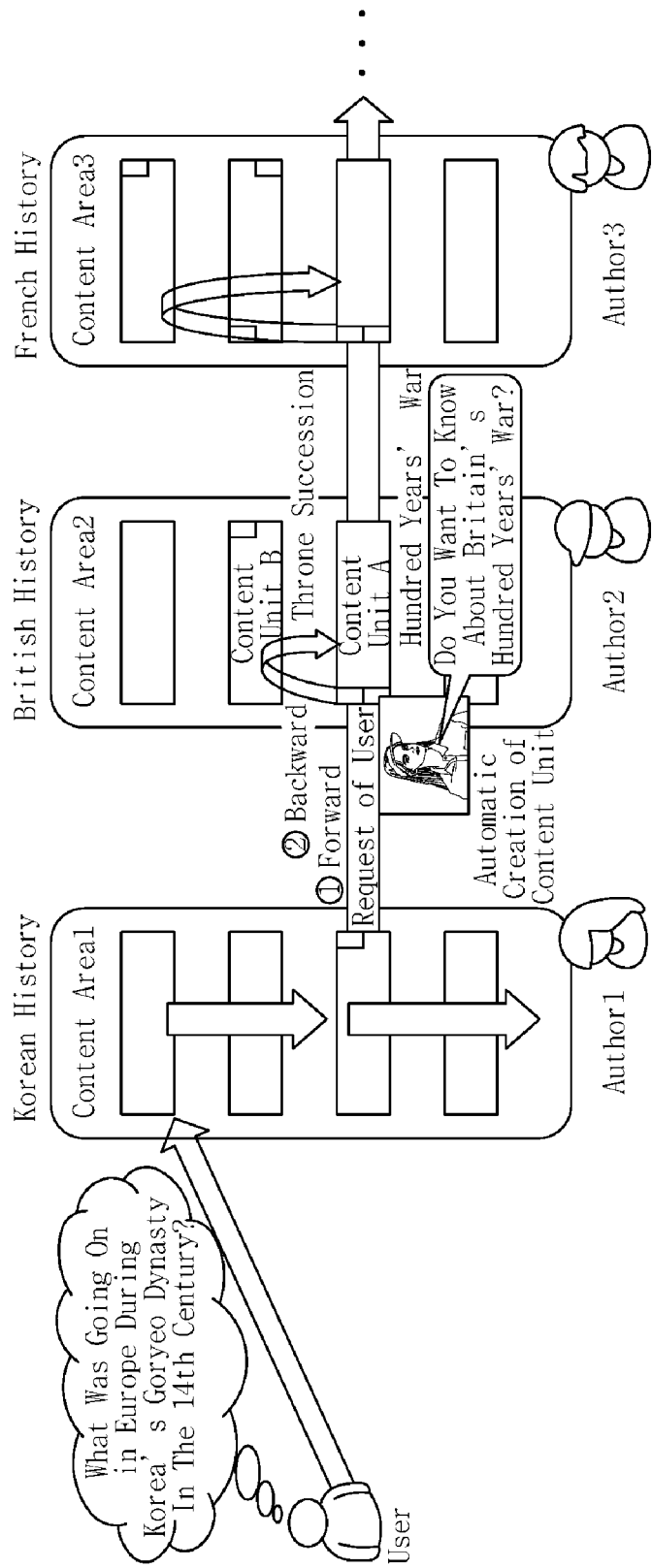
FIG. 6 shows examples to which an exemplary digital content providing apparatus is applied.
Figure 7:
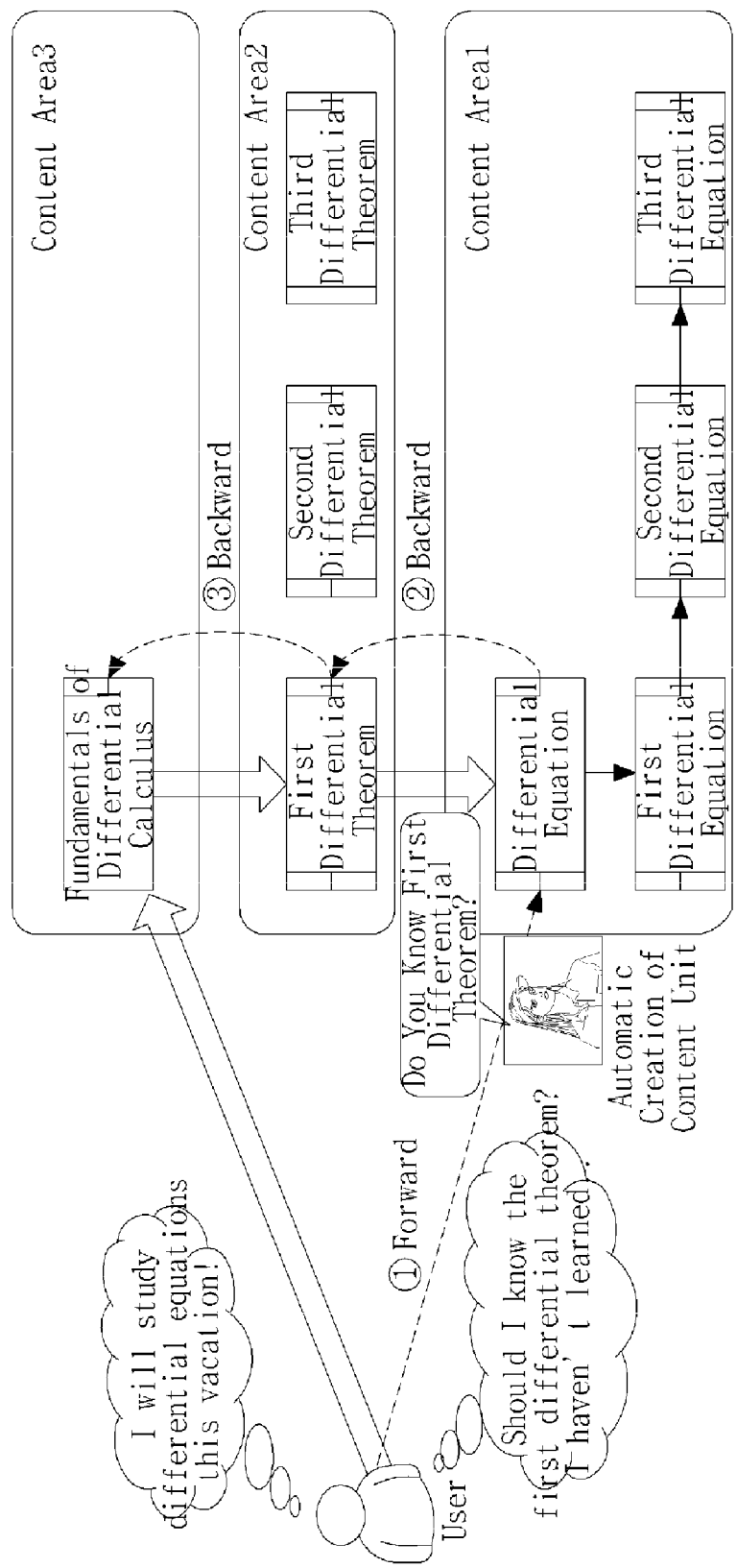
FIG. 7 shows additional examples to which an exemplary digital content providing apparatus is applied.

The foregoing digital content providing apparatus has various applications. FIGS. 6 and 7 show additional examples.

Referring to FIG. 6, suppose that a user suddenly wants to know about events that happened in Europe at a certain time while watching/listening to Korean historical contents.

If the user searches for contents using "Korean history" as a search keyword, the digital content providing apparatus 100 reproduces contents of "Korean history" composed by a first author. If the user watching/listening to a content unit about Korea's Goryeo Dynasty in the 14$^{th}$ century requests to know about what was going on in Europe at that time, the digital content providing apparatus 100 may search for a content unit having pre-conditions, such as "location (Britain)," "time (14$^{th}$ century)," "event (Hundred Years' War)," and "cause (throne succession)" within "British history" from the content database in the forward planning method. At this time, the "location (Britain)" is in Europe and the "time (14$^{th}$ century)" is the 14$^{th}$ century both matches the user's request, but it needs to be decided whether the "event (Hundred Years' War)" and the "cause (throne succession)" match the user's request. The digital content providing apparatus 100 may automatically create a separate content unit asking the user whether the user is interested in the Hundred Years' War or wants to watch related contents (e.g., "Do you want to know about Britain's Hundred Years' War?") in real time in order to satisfy the "event (Hundred Years' War)" among the pre-conditions and may reproduce the created separate content unit.

When the user answers "yes," the pre-condition of the "event (Hundred Years' War)" is satisfied. When the user answers "no," French history (third content area) may be provided as the next content candidate.

The digital content providing apparatus 100 may automatically create a separate content unit asking the user whether the user knows about the throne succession conflict that caused the Hundred Years' War or wants to watch related contents (e.g., "The Hundred Years' War resulted from a throne succession conflict. Do you want to learn more?") in real time in order to satisfy the "cause (throne succession)" among the pre-conditions and may reproduce the created separate content unit.

When the user answers "yes," the previous content unit B may be searched for using the backward planning method and may be reproduced to satisfy the pre-condition of the "cause (throne succession)," and then the content unit A may be continuously reproduced. When the user answers "no," the digital content providing apparatus 100 may automatically create and reproduce a separate content unit asking the user whether to ignore the pre-condition in real time.

In such a manner, the user can watch/listen to successive contents about events in other European countries during the 14$^{th}$ century, as desired, while watching/listening to contents about Korean history. Further, the user can return to the original Korean history at any time while watching/listening to events in other European countries in the 14$^{th}$ century. Also, the user may make another request at any time and seamlessly enjoy the successive contents, as long as they exist in the content database. When there is no succeeding content unit, the user may continuously be informed and may watch/listen to the original contents.

Thus, the digital content providing apparatus 100 may continuously and seamlessly provide the interactive contents by linking the independent contents naturally. Accordingly, the user may continuously and organically receive diverse related information.

Referring to FIG. 7, suppose that a user wants to study differential equations. In this example, knowledge of a first differential theorem is needed as a pre-condition of differential equation contents. Since there is no information about whether the user knows the first differential theorem, a content unit displaying a screen asking, for example, "Do you know the first differential theorem?" may be automatically created to determine the condition through interaction with the user. When the user answers that the user knows the first differential theorem, the condition is satisfied and the differential equation contents may be reproduced.

When the user answers that the user does not know the first differential theorem, the backward planning method may be used to move to the content unit of the first differential theorem and satisfy the condition. When the pre-condition of the first differential theorem may require fundamentals of differential calculus, the satisfaction of the condition may be induced by moving to content units of the fundamentals of differential calculus in other content areas. That is, after the pre-condition is satisfied by sequentially reproducing content unit chains formed by the backward planning method (e.g., reproduction in order of the content unit of the fundamentals of differential calculus→the content unit of the first differential theorem); the first differential equation contents may be continuously reproduced.

Thus, it is possible to track and reproduce contents even though they belong to other content areas so that the user can reach voluminous content. That is, the user may select and combine independent contents to create interactive contents according to the user's purpose. Appropriate contents also may be seamlessly and continuously provided within a continuous story space to enhance the user's concentration. Further, conditions may be satisfied by automatically asking questions of the user or soliciting the user's selection so that the purpose and knowledge of the user's desired contents may be interpreted in more detail and a story can unfold through interaction with the user.

Figure 8:
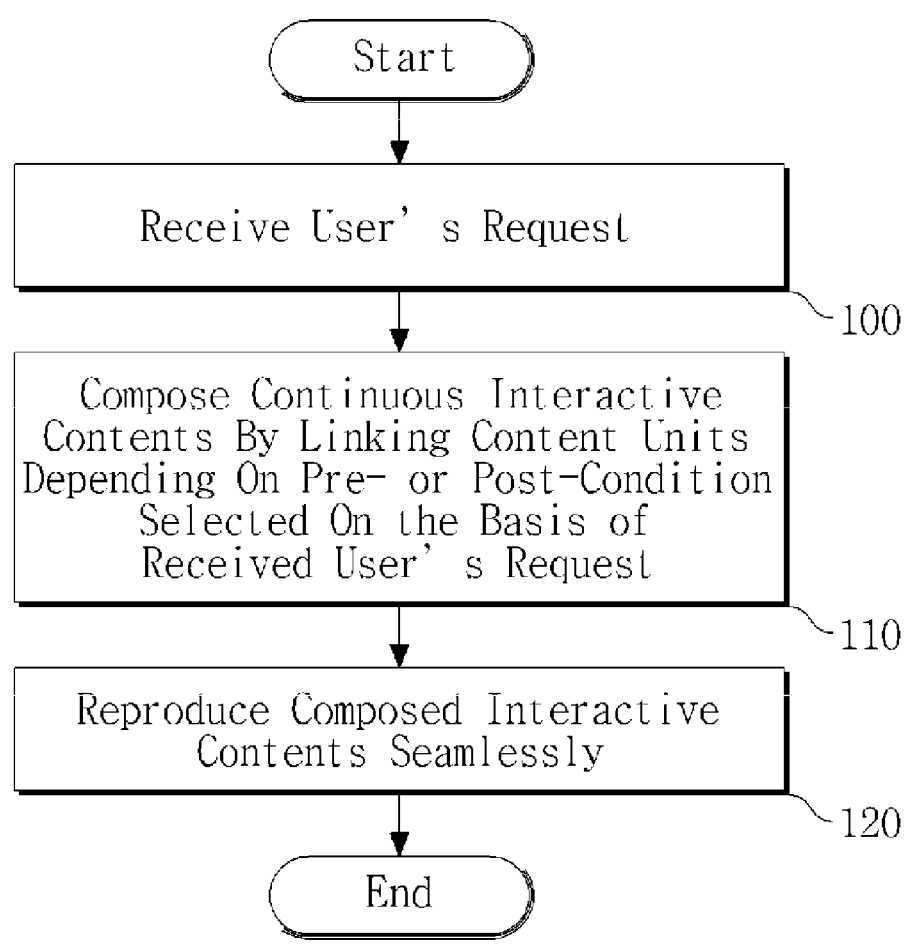
FIG. 8 is a flowchart illustrating an exemplary method of providing digital contents.
Figure 9:
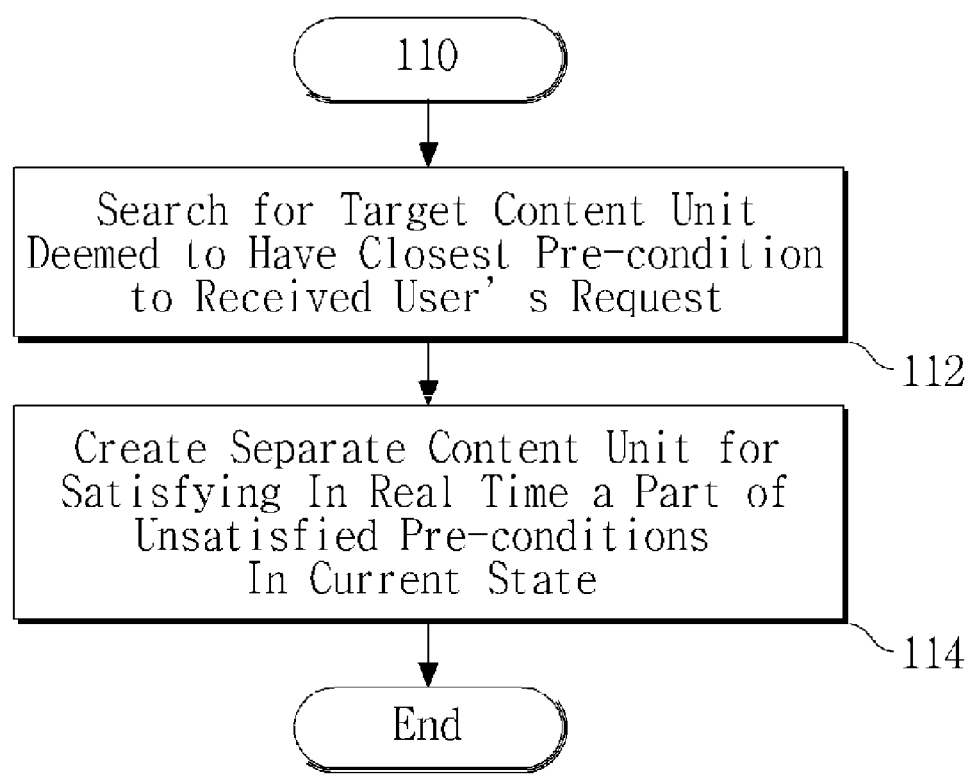
FIG. 9 is another flowchart illustrating an exemplary method of providing digital contents.
Figure 10:
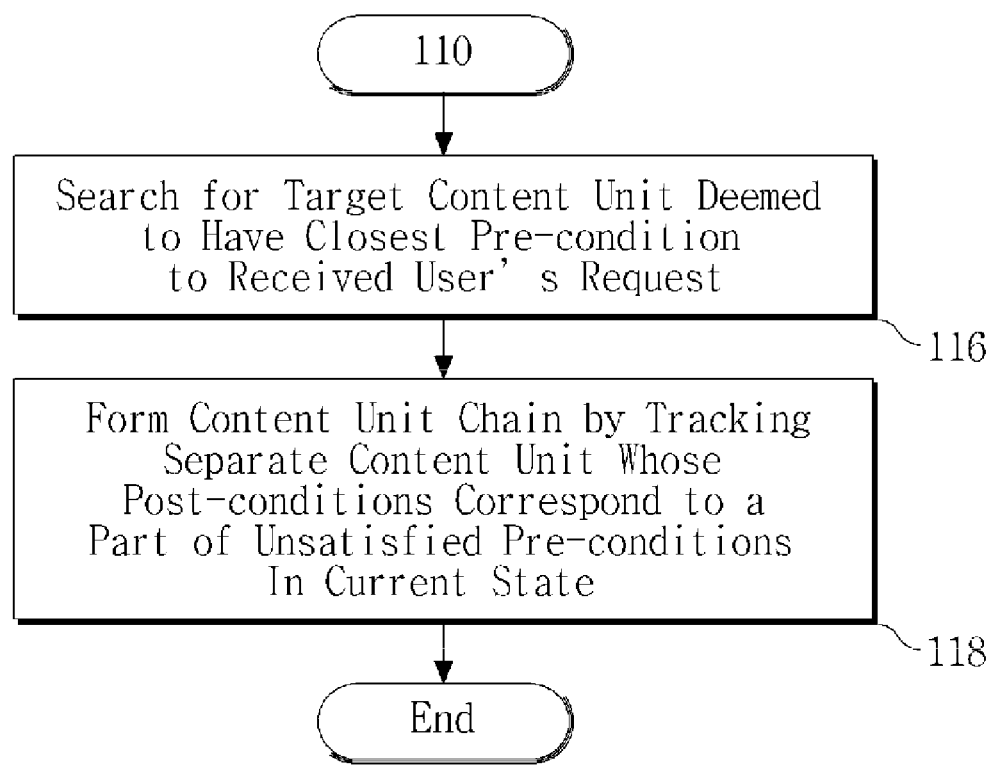
FIG. 10 is another flowchart illustrating an exemplary method of providing digital contents.

FIGS. 8, 9, and 10 illustrate exemplary methods of providing digital contents.

Referring to FIG. 8, a user requests contents (100); at least two content units are linked based on at least one pre- or post-condition selected on the basis of the user's request to thereby compose continuous interactive contents (110); and the composed interactive contents are continuously reproduced (120).

In this regard, two methods may be applied when the interactive contents are composed. As shown in FIG. 9, a target content unit evaluated to have the closest pre-condition to a user's request is searched for (112) and a separate content unit for satisfying a part of unsatisfied pre-conditions needed for running the target content unit in the current state is created in real time (114).

As shown in FIG. 10, a content unit candidate evaluated to have the closest pre-condition to a user's request is searched for (116) and a separate content unit whose post-conditions correspond to a part of unsatisfied pre-conditions needed for running a target content unit in the current state is tracked down to form a content chain (118).

As discussed above, an interaction function may be automatically added between two or more contents selected for one purpose to provide continuity between the provided contents. The interaction between the user and contents may bring results closer to the user's intensions and may allow the user access to contents within a very broad content space.

Further, a method of searching for and using contents may be changed from the existing method of individually searching for contents into a method of automatically recomposing and providing the interactive contents based on the user's purpose. A new solution that breaks free of the existing technique of searching for contents individually and enables searching for contents to maintain a continuous story space is provided, so that various advantages may be expected.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An digital content providing apparatus, the apparatus comprising a processor, wherein the processor comprises:
   an interactive content composer to compose continuous interactive contents by linking a previous content unit and a target content unit having at least one unsatisfied pre-condition, which are determined from a request of a user and which should be satisfied before running the target content unit; and
   a reproducer to seamlessly reproduce the composed interactive contents.

2. The apparatus as claimed in claim 1, wherein the interactive content composer comprises:
   a searching part to search for the target content unit evaluated to have a closest pre-condition to the user's request; and
   an automatic content creator to create a separate content unit to satisfy in real time a part of unsatisfied pre-conditions needed for running the target content unit in a current state.

3. The apparatus as claimed in claim 2, wherein the automatic content creator is configured to create the separate content unit prompting the user to select or to respond to the separate content unit in order to satisfy the part of the unsatisfied pre-conditions.

4. The apparatus as claimed in claim 3, wherein the reproducer reproduces the target content units continuously in response to selection or response of the user acquired by reproducing the separate content unit.

5. The apparatus as claimed in claim 1, wherein the interactive content composer comprises:
   a searching part to search for the target content unit having a pre-condition closest to the request of the user; and
   a planning part to generate a content unit chain by tracking a separate content unit having post-conditions corresponding to a part of unsatisfied pre-conditions needed for running the target content unit in a current state.

6. The apparatus as claimed in claim 5, wherein the planning part generates the content unit chain by extending the tracking to other content areas when no content unit containing post-conditions corresponding to the part of the unsatisfied pre-conditions is located.

7. The apparatus as claimed in claim 5, wherein the planning part performs at least one of abandoning a pre-condition which has a relative low weight by weighting at least one pre-condition of the target content unit; abandoning a pre-condition which is determined to be relatively less important than other pre-conditions based on a context; and abandoning a pre-condition dependent on only one content area concerned regardless of the request of the user.

8. The apparatus as claimed in claim 5, wherein the reproducer reproduces the target content unit chain after satisfying the pre-conditions of the target content unit.

9. A method for providing digital contents performed by a processor, the method comprising:
   composing by an interactive content composer continuous interactive contents by linking a previous content unit and a target content unit having at least one unsatisfied pre-condition, which are selected on the basis of a request of a user and which should be satisfied before running the target content unit; and
   reproducing by a reproducer the composed interactive content seamlessly.

10. The method as claimed in claim 9, wherein composing the interactive content comprises:
   searching for the target content unit evaluated to have a closest pre-condition to the request of the user; and
   creating a separate content unit to satisfy in real time a part of unsatisfied pre-conditions needed for running the target content unit in a current state.

11. The method as claimed in claim 10, wherein creating the separate content unit comprises creating a separate content unit to prompt the user to select or respond in order to satisfy the part of the unsatisfied pre-conditions.

12. The method as claimed in claim 11, wherein reproducing the composed interactive content comprises continuously reproducing the target content units in response to the selection or response of the user acquired by reproducing the separate content unit.

13. The method as claimed in claim 9, wherein composing the interactive content comprises:
   searching for the target content unit having a pre-condition closest to the user's request; and
   generating a content unit chain by tracking a separate content unit whose post-conditions correspond to a part of unsatisfied pre-conditions needed for running the target content unit in a current state.

14. The method as claimed in claim 13, wherein composing the interactive content comprises generating a content unit chain by extending the tracking to other content areas when no content unit whose post-conditions correspond to the part of the unsatisfied pre-conditions is located.

15. The method as claimed in claim 13, wherein composing the interactive content comprises at least one of abandoning a pre-condition which has a relative low weight by weighting at least one pre-condition of the target content unit; abandoning a pre-condition determined to be relatively less important than other pre-conditions based on context; and abandoning a pre-condition dependent on only one content area concerned regardless of the user's request.

16. The method as claimed in claim 13, wherein reproducing the composed interactive content comprises reproducing a target content unit chain after satisfying the pre-conditions of the target content unit.

* * * * *